United States Patent
Xu et al.

(10) Patent No.: US 11,977,317 B2
(45) Date of Patent: May 7, 2024

(54) ORGANIC THIN-FILM QUANTUM SOURCES

(71) Applicant: Brown University, Providence, RI (US)

(72) Inventors: Jimmy Xu, Providence, RI (US); Petr Moroshkin, Providence, RI (US); Akshay Nagar, Providence, RI (US)

(73) Assignee: Brown University, Providence, RI (US)

( * ) Notice: Subject to any disclaimer, the term of this patent is extended or adjusted under 35 U.S.C. 154(b) by 0 days.

(21) Appl. No.: 18/170,068

(22) Filed: Feb. 16, 2023

(65) Prior Publication Data
US 2024/0053653 A1 Feb. 15, 2024

Related U.S. Application Data

(63) Continuation of application No. 17/474,771, filed on Sep. 14, 2021, now Pat. No. 11,604,398.

(60) Provisional application No. 63/078,617, filed on Sep. 15, 2020.

(51) Int. Cl.
*G02F 1/355* (2006.01)
*G02F 1/35* (2006.01)

(52) U.S. Cl.
CPC .......... *G02F 1/3551* (2013.01); *G02F 1/3503* (2021.01)

(58) Field of Classification Search
CPC .............................. G02F 1/3503; G02F 1/3551
See application file for complete search history.

(56) References Cited

U.S. PATENT DOCUMENTS

| | | | |
|---|---|---|---|
| 9,057,929 B2 | 6/2015 | Kwon | |
| 10,129,021 B2 | 11/2018 | Jeong et al. | |
| 10,481,467 B2 | 11/2019 | Satoh et al. | |
| 11,604,398 B2* | 3/2023 | Xu | G02F 1/3503 |

FOREIGN PATENT DOCUMENTS

| | | |
|---|---|---|
| WO | 03065117 A1 | 8/2003 |
| WO | 2021117632 A1 | 6/2021 |

OTHER PUBLICATIONS

Kocharovsky et al., "Spontaneous Symmetry Breaking and Nonlinear Population Inversion Grating in a Low-Q CW Laser", IEEE, 2019 CLEO Europe and EQEC (Munich, Germany, Jun. 23-27, 2019), OSA Technical Digest, one page. (Year: 2019).*
Talebi et al., "Plasmonic grating as a nonlinear converter-coupler", Optics Express, vol. 20, No. 2, pp. 1392-1405 (14 pages) (Year: 2012).*
Autere, et al., "Optical Harmonic Generation in Monolayer Group-vi Transition Metal Dichalcogenides", Physical Review B, Sep. 6, 2018, pp. 1-7.
Bock, et al., "Highly Efficient Heralded Single-photon Source for Telecom Wavelengths Based on a PPLN Waveguide", Optics Express, vol. 24, No. 21, Oct. 17, 2016, pp. 23992-24001.

(Continued)

*Primary Examiner* — Daniel Petkovsek
(74) *Attorney, Agent, or Firm* — Adler Pollock & Sheehan P.C.

(57) ABSTRACT

A photon source for generating entangled photons includes a pump laser, and 4-N, N-dimethylamino-4'-N'-methyl-stilbazolium-tosylate (DAST) crystals, the pump laser pumping the DAST crystals with pump photons to generate a stream of pairs of entangled photons, each pair comprising a signal photon and an idler photon.

7 Claims, 2 Drawing Sheets

(56) References Cited

OTHER PUBLICATIONS

Fan, et al., "Organic DAST Single Crystal Meta-Cavity Resonances at Terahertz Frequencies", ACS Photonics, vol. 6, Issue 7, Jun. 25, 2019, pp. 1674-1680.

Helt, et al., "How Does It Scale? Comparing Quantum and Classical Nonlinear Optical Processes in Integrated Devices", Journal of the Optical Society of America B : optical physics, vol. 29, No. 8, Aug. 2012, pp. 2199-2212.

Hu, et al., "Tunable Organic Metasurface Based on 4-N,N-dimethylamino-4'-N'-methyl-stilbazolium Tosylate (DAST) Single Crystal", Optics Communications, vol. 474, 2020, 7 pages.

Jazbinsek, et al., "Photonic Applications With the Organic Nonlinear Optical Crystal Dast", IEEE Journal of Selected Topics in Quantum Electronics, vol. 14, No. 5, Sep./Oct. 2008, pp. 1298-1311.

Kwiat, P. G., "New High-intensity Source of Polarization-entangled Photon Pairs", Physical Review Letters, vol. 75, Dec. 11, 1995, pp. 4337-4341.

Lohrmann, et al., "Broadband Pumped Polarization Entangled Photon-pair Source in a Linear Beam Displacement Interferometer", Applied Physics Letters, vol. 116, Jan. 13, 2020, 5 pages.

Meier, et al., "Parametric Interactions in the Organic Salt 4-N, N-dimethylamino-4'-N'-methyl-stilbazolium Tosylate at Telecommunication Wavelengths", Journal of Applied Physics, vol. 83, No. 7, Apr. 1, 1998, pp. 3486-3489.

Nawata, et al., "Efficient Terahertz-Wave Generation Using a 4-Dimethylamino-N-methyl-4-stilbazolium Tosylate Pumped by a Dual-Wavelength Neodymium-Doped Yttrium Aluminum Garnet LaserEfficient Terahertz-Wave Generation Using a 4-Dimethylamino-N-methyl-4-stilbazolium Tosyla", Applied Physics Express, vol. 5, 2012, pp. 112401-1-112401-3.

Shainline, et al., "Directly Pumped Silicon Lasers", Optics and Photonics News, vol. 19, issue 5, May 2008, pp. 34-39.

Shainline, et al., "Silicon as an Emissive Optical Medium", Laser & Photonics Review, vol. 1, Issue 4, 2007, pp. 334-348.

Shainline, et al., "Slow Light and Band Gaps in Metallodielectric Cylinder Arrays", Optics Express, vol. 17, No. 11, May 25, 2009, 13 pages.

Slattery, et al., "Background and Review of Cavity-enhanced Spontaneous Parametric Down-conversion", Journal of Research of the National Institute of Standards and Technology, vol. 124, Aug. 22, 2019, pp. 1-18.

Tian, et al., "Dast Optical Damage Tolerance Enhancement and Robust Lasing via Supramolecular Strategy", ACS Photonics, vol. 7, Jul. 1, 2020, pp. 1-13.

Varnavski, et al., "Entangled Photon Excited Fluorescence in Organic Materials: An Ultrafast Coincidence Detector", The Journal of Physical Chemistry Letters, 2017, pp. 388-393.

Wengerowsky, et al., "Passively Stable Distribution of Polarization Entanglement Over 192 Km of Deployed Optical Fibre", NPJ Quantum Information, 2020, pp. 1-4.

Yang, et al., "Spontaneous Parametric Down-conversion in Waveguides: A Backward Heisenberg Picture Approach", Physical Review A, vol. 77, Issue 3,, 2008, pp. 033808-1-033808-13.

Zhang, et al., "Stress-Tuning of Optical Rectification in Organic 4-N, N-dimethylamino-4'-N'-methyl-stilbazolium tosylate (DAST)", Optical Materials, vol. 92, Jun. 2019, pp. 251-254.

* cited by examiner

ORGANIC THIN-FILM QUANTUM SOURCES

CROSS REFERENCE TO RELATED APPLICATIONS

This application is a Continuation of U.S. patent application Ser. No. 17/474,771, filed Sep. 14, 2021, now U.S. Pat. No. 11,604,398, which claims benefit from U.S. Provisional Patent Application Ser. No. 63/078,617, filed Sep. 15, 2020, which are incorporated by reference in their entireties.

STATEMENT AS TO FEDERALLY SPONSORED RESEARCH

This invention was made with government support under grant number 1530547 awarded by the National Science Foundation, grant numbers W911NF-14-2-0075 and W911NF-21-1-0181 awarded by the U.S. Army Research Office and grant number FA9550-19-1-0355 awarded by the Air Force Office of Scientific Research. The government has certain rights in the invention.

BACKGROUND OF THE INVENTION

The present invention relates generally to entangled photon sources, and more particularly to nanophotonic structures for quantum emitters/sensors.

In general, entangled photon sources have proven to be indispensable in quantum communications, sensing, and imaging. They enable entanglement distribution over long distances via optical fiber or free-space links as well as quantum correlated imaging with unprecedented resolution and spectroscopy details. Typically, entangled photon pairs are produced by Spontaneous Parametric Down-Conversion (SPDC)—a second-order nonlinear optical process, purely quantum mechanical in nature, in which a single pump photon is converted into a pair of lower-frequency photons. Entangled photons can also be generated in another quantum wave mixing process—spontaneous four-wave mixing (SFWM).

However, for a long-haul entanglement distribution or quantum correlation sensing or imaging, even the state-of-the-art pair generation efficiency of $\sim 10^{-6}$ seems still inadequate. Further advances in quantum entanglement distribution and quantum sensing/imaging call for a greatly improved entangled photon source with a much greater efficiency than what has been made available to date. Its development has been limited by the nonlinear optical material, the phase-matching condition, and the optical damage threshold, and then further constrained by the practical but all-too-important requirements such as portability and a small footprint, among others.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a photon source for generating entangled photons including a pump laser, and a nonlinear organic optical material, the pump laser pumping the nonlinear organic optical material with pump photons to generate a stream of pairs of entangled photons, each pair comprising a signal photon and an idler photon.

In another aspect, the invention features a photon source for generating entangled photons including a pump laser, and 4-N, N-dimethylamino-4'-N'-methyl-stilbazolium-tosylate (DAST) crystals, the pump laser pumping the DAST crystals with pump photons to generate a stream of pairs of entangled photons, each pair comprising a signal photon and an idler photon.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

DETAILED DESCRIPTION

Figure 1:
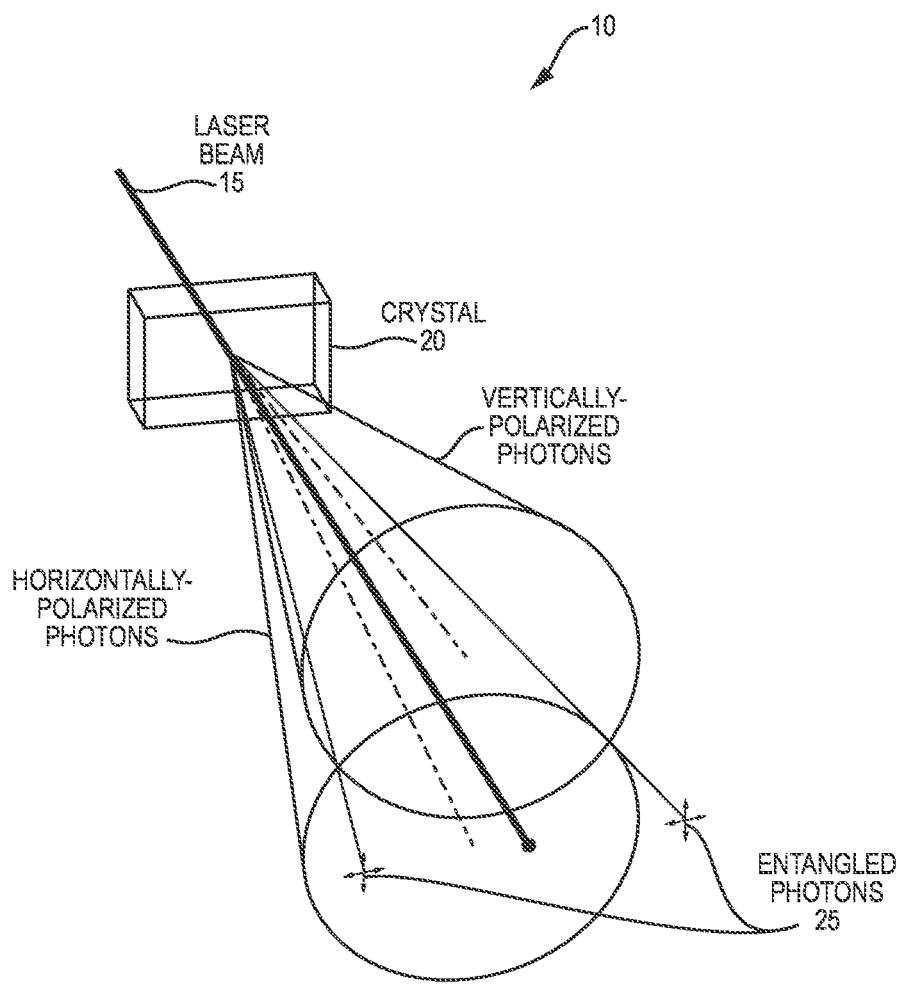
FIG. 1 is an illustration of an exemplary spontaneous parametric down-conversion (SPDC) apparatus.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The present invention is an entangled photon source with the potential to deliver orders of magnitude greater efficiency over the current state of the art. The present invention provides light-matter interactions with a new organic nonlinear material system for maximizing the quantum spontaneous parametric down-conversion (SPDC) efficiency. In the one embodiment, at the core of the invention is a DAST (4-N, N-dimethylamino-4'-N'-methyl-stilbazolium-tosylate) system, which in its crystal form has superior nonlinear properties over a broadband from sub-THz to visible, including a $\chi^{(2)}$ many times larger than that of $LiNbO_3$. The DAST crystal is engineered into an ultrathin and strained film form in a plasmonic metamaterial system to acquire a yet greater $\chi^{(2)}$ and to relax the phase-matching constraint. This is done together with strategies to address any optical damage threshold issues.

Spontaneous parametric down-conversion (also known as SPDC, parametric fluorescence or parametric scattering) is a nonlinear instant optical process that converts one photon of higher energy (namely, a pump photon), into a pair of photons (namely, a signal photon, and an idler photon) of lower energy, in accordance with the law of conservation of energy and law of conservation of momentum. As shown in FIG. 1, an exemplary SPDC apparatus 10 includes a strong laser beam 15, termed a "pump" beam, and a non-linear crystal 20. The pump beam 15 is directed at the non-linear-crystal 20 where most of the photons continue straight through the crystal 20. However, occasionally, some of the photons undergo spontaneous down-conversion, and the resultant correlated photon pairs have trajectories that are constrained along the edges of two cones, whose axes are symmetrically arranged relative to the pump beam 15. Also, due to the conservation of momentum, the two photons are always symmetrically located along the edges of the cones, relative to the pump beam 15. The trajectories of the photon pairs may exist simultaneously in the two lines where the cones intersect. This results in entanglement of the photon pairs 25 whose polarizations are perpendicular.

A nonlinear organic optical material—4-N, N-dimethyl-amino-4'-N'-methyl-stilbazolium tosylate, also known as DAST, is a tremendous utility in its crystal form in a number of applications. Its large $\chi^{(2)}$ and efficient second harmonic generation and optical parametric oscillation have been observed in the visible and near infrared spectral range, including the telecom wavelengths 1313 and 1535 nm. Measured values of $\chi^{(2)}$ of bulk DAST crystals and the engineered ultrathin films are given in Table I and compared with other most efficient nonlinear media (bulk).

TABLE I

| material | wavelength (nm) | $\chi^{(2)}$ (pm/V) |
| --- | --- | --- |
| DAST bulk | 800 | 490 |
| DAST film | 800 | $2.3 \times 10^4$ |
| KTP | 1064 | 34 |
| BBO | 1064 | 4.4 |
| LiNbO$_3$ | 1064 | 70 |

More specifically, Table I illustrates Measured values of $\chi^{(2)}$ of DAST in comparison with the most used nonlinear optical materials. These were obtained from SHG experiments and the given wavelengths correspond to the fundamental.

The $\chi^{(2)}$ values of DAST in its bulk crystal and thin film forms are greater than its counterparts, by one to three orders of magnitude.

As is typical for organic materials, DAST is relatively flexible, scalable, and has a low melting point (256° C.). Its optical quality crystals and films are grown at low temperatures that are beneficial for the integrability with and compatibility to semiconductor and/or oxide substrates for future advanced uses in, for example, compact portable sources. And they can be integrated with waveguides and quantum detection photonics.

In the case of DAST and especially its thin films, the ordinary and extraordinary refraction indices can also be tuned by applying external stress due to its organic nature and relative flexibility.

In a thin film, the phase-matching condition is alleviated as the nonlinear interactions between the pump photons and the down-converted signal and idler photons vanish outside the film. The film thickness must be smaller than the coherence length of the pump and down-converted emission that is estimated to be of the order of 10 micron.

We demonstrated an extraordinary efficiency of SHG in DAST ultrathin films that is three orders of magnitude greater than that in a bulk DAST crystal or other conventional nonlinear optical material (Table 1). The effect is partly attributed to the giant enhancement of $\chi^{(2)}$ in strained DAST molecules under a static stress induced at the interface between the DAST film and a SiO$_2$ substrate as well as to the surface-tension of the nanometer-thin micro-platelet constituents of the film. It has also likely benefited from the alleviation of the phase-matching constraint.

SPDC in subwavelength-films of nonlinear media is still in its infancy but has shown great promise in experiments. In such ultrathin films, one may expect a reduced sensitivity to phase-matching and a greatly strain-enhanced nonlinearity.

Our research demonstrates that a nonlinear optical susceptibility may be induced in a material that itself possesses $\chi^{(2)}=0$, by creating a sub-wavelength periodic structure with a unit cell lacking inversion symmetry. Here, this method is used to enhance $\chi^{(2)}$ of DAST film by placing it on top of a metallic (gold) non-symmetric periodic structure, such as shown in FIG. 2b.

Electric field enhancement is expected near the sharp corners of the grooves/ridges thus increasing the pump intensity and the SPDC yield. Reflected pump light and generated idler/signal are diffracted under different angles, depending on their wavelengths.

In the implementation of DAST as a bright quantum source, the optical damage can be a source of concern. It'd be a legit and natural concern too. As in many other nonlinear optical materials, DAST crystals can be damaged by high-power pump light. Of the optical damage mechanisms studied, thermal damage stands out as the primary one. In addition, a prolonged laser irradiation could lead to photobleaching by inducing structural modification or decomposition of DAST molecules.

Intensifying the pump field in the near-field zone where the ultrathin DAST film is and where it also has the highest thermal conductance to the heat sink can have the effect of lowering the pump power and thereby the chance of optical damage everywhere else.

The photon source depicted in FIG. 2b, where a thin film of DAST (or any other suitable nonlinear optical material) is placed on top of a metallic grating consisting of a metal (e.g., gold) film with sub-wavelength grooves and ridges (terraces) is shown. The grooves and ridges form a periodic array, with a unit cell lacking the inversion symmetry. In particular, a structure shown in FIG. 2b has a unit cell consisting of two grooves of unequal widths and two terraces of unequal width. The grating underlying the DAST film serves several main purposes. First, local enhancement of the pump field near the corners of the ridges. Second, separation of residual reflected pump from the down-converted emission due to the diffraction under different angles (as in a conventional grating spectrometer). Third; concentration of the down-converted emission from the entire area of the source into the same direction, where it can be picked and collected by a lens into a fiber, or another optical system. Fourth, due to the broken inversion symmetry, the grating possesses its own optical nonlinearity that is going to enhance the nonlinearity of DAST. And fifth, there may be a further enhancement of the nonlinearity of DAST due to a local strain induced in the DAST film be its interaction with the underlying grating/substrate.

Especially promising are microcrystals of DAST molecules encapsulated in β-cyclodextrin (β-CD) which possess an even higher nonlinear susceptibility than pure DAST and a greatly improved stability with respect to photobleaching, thus allowing a much larger pumping power and a much higher optical damage threshold. The DAST@β-CD is still new to the field however, with its spectroscopy not yet fully established, and its refractive indices and photoabsorption coefficient at the wavelengths of interest have to be investigated.

Although the expected efficiency of SPDC in DAST is much higher, due to the greatly enhanced $\chi^{(2)}$ along with a relaxed phase-matching condition, than that in conventional nonlinear media, only a small fraction of the pump power can be converted into the signal/idler photons in a conventional one-pass set-up, which at present also has an aperture limited by the commercially available periodically poled crystal size of 1-2 mm.

The yield can be increased greatly by effectively recycling back and passing the pump beam through the nonlinear medium many times. In so doing, one would effectively increase the pumping power or the 'effective aperture.' For a bulk DAST crystal this can be achieved by placing it in a Fabry-Perot cavity, resonant with pumping laser beam. Tuning the cavity into resonance with the signal and idler waves allows one to greatly reduce the linewidth and increase the spectral brightness of the down converted emission.

Moreover, microcrystals and their films can also be incorporated into a 2D subwavelength meta-surface or metamaterial that is designed for maximum 'capture and intensification' of the pump photons and maximum extraction of the SPDC generated longer wavelength photons. Here, "capture and intensification" implies both trapping and intensifying the pump light and thus maximizing its interaction with an ultrathin layer of active material (DAST) in the near-field zone of the plasmonic surface. One example of such a wavelength-selective structure incorporating a DAST film is illustrated in FIG. 2a.

Figure 2A:
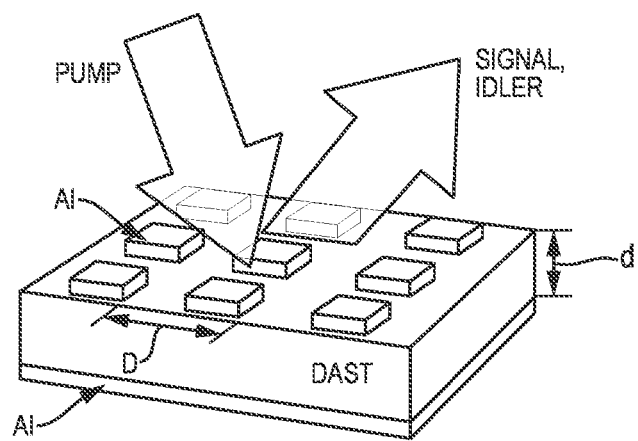
FIGS. 2a and 2b are illustrations of a DAST-based material.
Figure 2B:
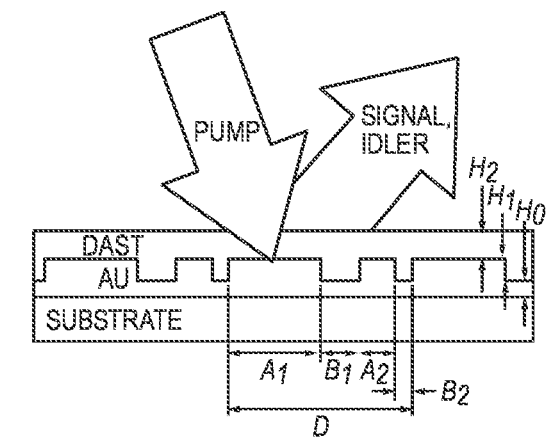
Figure 2B:
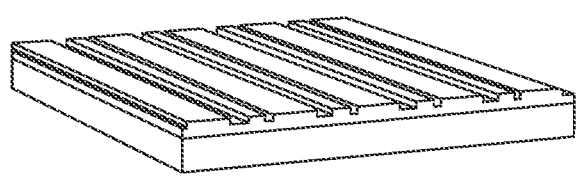

FIG. 2a shows a 2D metastructure, where a thin film of DAST is sandwiched in between metallic films. The lower metal film is continuous and is acting as a mirror. The upper metal film is structured into a periodic array of rectangular patches. Together with the lower film, the patches form an array of microresonators that trap and confine the pump light and emit the generated signal and idler waves.

Taking an arrayed meta-surface structure illustrated in FIG. 2a as an example, by judicious design of the sub-wavelength parameters (D, d, P) of the DAST meta-surface, corresponding the pump and signal/idler waves and their phase matching condition, a near-perfect absorption (trapping) of the pumping light can be achieved in the system. Under such conditions, the pump converts into the surface plasmon polariton wave propagating along the DAST-metal interface leading to a most efficient interaction of the pump with the sub-wavelength DAST film and a near-perfect extraction of entangled photons. It is also intuitively evident that the pump power is spatially distributed over a large surface area (aperture). Yet, the field is intensified in the near-field zone at each metal-DAST interface, so is the heat removal. The SPDC output is a collective sum of all the unit cells in the array.

On the front of optical damage threshold, one may expect a second set of potential benefits in such DAST meta-surface designs in terms of maximizing the light-matter interaction where it is needed and removing the heat where it is generated, and minimizing the pump light everywhere else.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A structure comprising:
   a pump laser;
   a 4-N, N-dimethylamino-4'-N'-methyl-stilbazolium-tosylate (DAST) film; and
   a one-dimensional (1D) grating with broken inversion symmetry configured to enhance an effective nonlinearity, the DAST film positioned on top of the 1D grating with broken inversion symmetry,
   the pump laser pumping the DAST film with pump photons to generate a stream of pairs of entangled photons, each pair comprising a signal photon and an idler photon.

2. The structure of claim 1 wherein the 1D grating is a metallic grating consisting of a metal film with sub-wavelength grooves and ridges configured to enhance a local electric field of the pump laser.

3. The structure of claim 2 wherein the grooves and ridges form a periodic array, with a unit cell lacking an inversion symmetry.

4. The structure of claim 2 wherein the metallic grating is configured to remove heat and protect the DAST film from damage.

5. The structure of claim 4 wherein the metallic grating is a metallic non-symmetric periodic structure.

6. The structure of claim 5 wherein the metallic non-symmetric periodic structure is gold.

7. A structure comprising:
   a pump laser;
   a patterned array of 4-N, N-dimethylamino-4'-N'-methyl-stilbazolium-tosylate (DAST) microcrystals; and
   a one-dimensional (1D) grating with broken inversion symmetry configured to enhance an effective nonlinearity, the patterned array of DAST microcrystals positioned on top of the 1D grating with broken inversion symmetry,
   the pump laser pumping the patterned array of DAST microcrystals with pump photons to generate a stream of pairs of entangled photons, each pair comprising a signal photon and an idler photon.

* * * * *